United States Patent [19]

Wilkinson

[11] 4,430,401
[45] Feb. 7, 1984

[54] METHOD FOR PRODUCING A RECORDING DISC STAMPER

[75] Inventor: Richard L. Wilkinson, Torrance, Calif.

[73] Assignee: Discovision Associates, Costa Mesa, Calif.

[21] Appl. No.: 146,820

[22] Filed: May 5, 1980

Related U.S. Application Data

[62] Division of Ser. No. 48,081, Jun. 19, 1979.

[51] Int. Cl.³ ............... G03C 5/04; G03C 5/00; G03C 11/00; G01D 15/10
[52] U.S. Cl. ............................................ 430/8; 204/5; 204/6; 264/1.4; 264/25; 346/76 R; 346/76 L; 346/135.1; 427/53.1; 430/198; 430/320; 430/321; 430/324; 430/346; 430/945; 430/964
[58] Field of Search ............. 430/198, 292, 297, 320, 430/321, 323, 330, 346, 945, 324, 964, 8; 346/76 R, 76 L, 135.1; 148/2; 164/6, 9, 37, 41, 43, 44, 45, 75; 264/84, 106, 29.1, 25, 1.4; 204/5, 6; 427/53.1

[56] References Cited

U.S. PATENT DOCUMENTS

| | | | |
|---|---|---|---|
| 3,465,352 | 9/1969 | Carlson et al. | 346/76 L X |
| 3,475,760 | 10/1965 | Carlson | 346/1 |
| 3,560,994 | 2/1971 | Wolff et al. | 346/135 |
| 3,875,024 | 4/1975 | Picquendar et al. | 430/346 X |
| 4,023,185 | 5/1977 | Bloom et al. | 346/76 L X |
| 4,069,487 | 1/1978 | Kasai et al. | 346/76 L |
| 4,081,653 | 3/1978 | Koo et al. | 430/346 X |
| 4,139,853 | 2/1979 | Ghekiere et al. | 346/1 |
| 4,141,731 | 2/1979 | Jarsen | 430/320 X |
| 4,158,715 | 6/1979 | Smith et al. | 346/76 L X |
| 4,225,873 | 9/1980 | Winslow | 346/76 L X |

FOREIGN PATENT DOCUMENTS

2817357 1/1979 Fed. Rep. of Germany .

OTHER PUBLICATIONS

"A Comparsion of Plastic . . . Laser Recording", Congleton et al., J. of Applied Photo. Engig. vol. 3, No. 2, Spring 1977, pp. 98–105.

Primary Examiner—Richard C. Schilling
Attorney, Agent, or Firm—Ronald J. Clark

[57] ABSTRACT

An optical recording medium for use with a recording apparatus of the type that focuses onto the medium, as the medium is moved in a prescribed fashion, a beam of light that is modulated in intensity in accordance with a data signal to be recorded. The recording medium includes a substrate having a smooth, planar upper surface, with a thin light-absorbing coating overlaying the surface, such coating including an explosive material such as nitrocellulose, and a light-absorbing dye. As the medium is moved with respect to the intensity-modulated beam, the explosive coating is selectively energized by the beam to induce spaced explosions threin, whereby corresponding optically readable irregularities, representative of the data signal, are formed in the outer surface of the coating.

10 Claims, 7 Drawing Figures

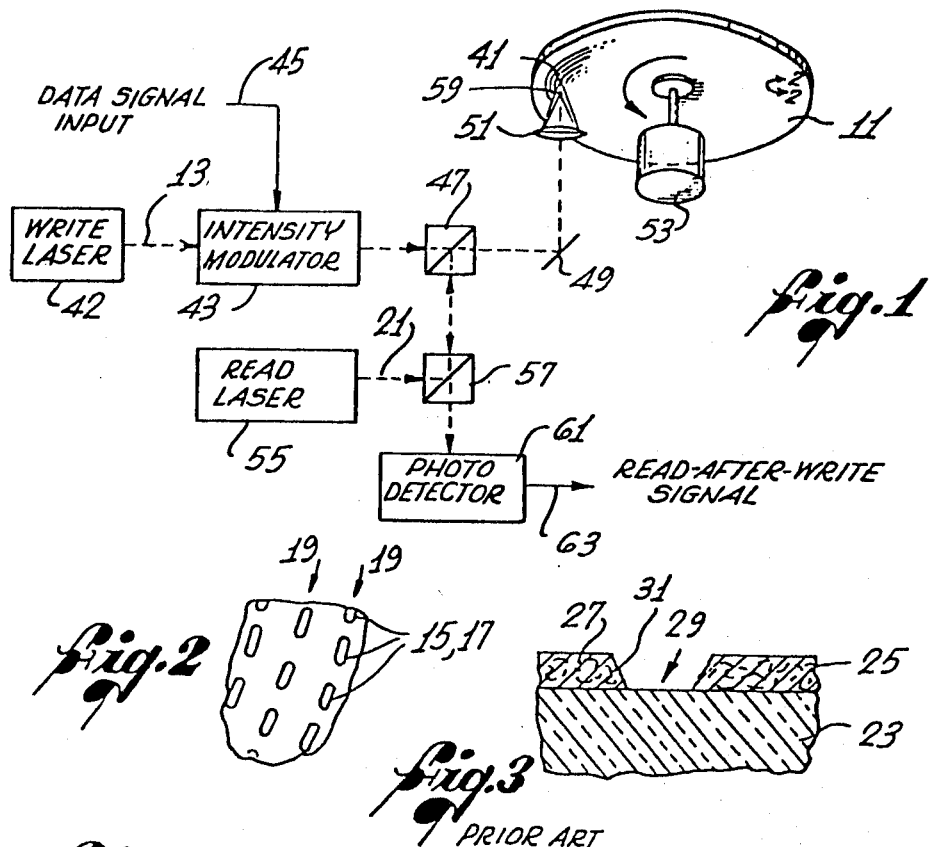

METHOD FOR PRODUCING A RECORDING DISC STAMPER

This is a division of application Ser. No. 48,081, filed June 19, 1979.

BACKGROUND OF THE INVENTION

This invention relates generally to information recording media, and, more particularly, to recording media of the type in which information can be both recorded and read using optical techniques.

Recording media of this particular type are especially adapted for use both as master discs for subsequent use in the production of replica discs, and for single recording discs that can be directly read while writing so that proper recording can be instantly verified. In both cases, an information signal is typically recorded in such a disc by a thermal process in which an intensity-modulated write beam of light is focused onto the disc as the disc is rotated in a prescribed fashion, thereby changing some characteristic of the disc, such as its reflectivity, in accordance with the information signal.

Recording media that can be used as master discs have typically included a glass substrate having a polished upper surface, with a thin coating of either a photoresist material or a metallic material deposited thereon. In the photoresist embodiment, the intensity-modulated write beam of light functions to expose a sequence of spaced, microscopic areas on the coating, indicative of the information signal being recorded, and a subsequent development of the photoresist material yields a master disc having a sequence of spaced, microscopic pits formed therein. This master disc can then be suitably coated with a thin layer of a metallic material, such as nickel, using an initial step of vacuum deposition by thermal evaporation, followed by a step of electroplating. The metallic layer can then be removed from the master disc to serve as a stamper, with the recorded information signal carried on its underside, for use in a suitable molding apparatus to produce disc replicas.

Although generally satisfactory in yielding master discs that can be used in the production of disc replicas, such photoresist recording media have not proven entirely satisfactory for a number of reasons. One reason for this dissatisfaction arises from an inability to read the recorded disc prior to the development step. This precludes a continuous adjustment of the recording apparatus, to optimize various recording parameters such as beam intensity and focus, as the disc is being recorded. Another drawback arises from a difficulty in producing pits in the medium having a diameter of less than about 0.5 microns, and from the fact that the pits in the disc can sometimes have edges that are ragged and grainy, yielding stampers that can damage the replica discs. Still another drawback arises from the need for an additional step of developing the photoresist material.

In the master disc embodiment that includes a thin metallic film, the intensity-modulated write beam of light functions to melt a sequence of spaced holes in the film, indicative of the information signal. Such a master disc is disclosed in a copending and commonly assigned application for U.S. patent, Ser. No. 890,407, filed in the name of John S. Winslow and entitled "Mastering Machine", now U.S. Pat. No. 4,225,873. Although a signal recorded on such a master disc can be read immediately after being recorded, the relatively high thermal conductivity of the metallic film results in the formation of information-bearing holes in the film that are larger even than those formed in the master discs having photoresist coatings. This limits the recording density that can be achieved. Additionally, a metallic residue is generally formed around each hole, thereby limiting the signal-to-noise ratio that can be achieved during playback of the resultant replica discs.

Recording media that can be used as single recording discs in direct-read-after-write recording apparatus have typically included thin metallic films overlaying plastic substrates or, alternatively, thin layers of highly light-absorptive dielectric materials overlaying substrates having a highly-reflective upper surface. Such discs normally further include a member spaced above the coated substrate to protect the coating from dust and abrasion. In direct-read-after-write recording discs having metallic films, the intensity-modulated beam of light functions to melt a sequence of spaced holes in the film, representative of the information being recorded. However, such metallic film recording discs are subject to the same drawbacks mentioned above, regarding metallic film master recording discs, and thus have not proven entirely successful. Specifically, this includes a limiting recording density and a limited signal-to-noise ratio.

In typical direct-read-after-write recording discs having a dielectric coating, on the other hand, a sequence of spaced-microscopic pits is formed in the dielectric coating by an evaporation or ablating of the coating. Although the pits can be made somewhat smaller in this medium than in the aforementioned metallic film medium, thereby permitting higher recording densities to be realized, the ablating process nevertheless produces a residue of material surrounding each pit that can adversely affect the signal-to-noise ratio that can be achieved during playback.

Thus, it will be appreciated that there is a need for a master recording disc in which even smaller information-bearing surface irregularities can be produced, without the need for a developing step, and without the formation of a residue material or rough edges that can adversely affect both the ultimate formation of replica discs and the signal-to-noise ratio that can be achieved during playback of such replica discs. Similarly, it will be appreciated that there is a need for a direct-read-after-write recording disc having even smaller and residue-free information-bearing surface irregularities, so that higher recording densities and higher signal-to-noise ratios can be achieved. These and other needs are fulfilled by the present invention.

SUMMARY OF THE INVENTION

Basically, the present invention is embodied in an improved recording medium for use with a recording apparatus of the type that directs onto the medium, as the medium is moved in a prescribed fashion, a write beam of light that is modulated in intensity in accordance with a data signal to be recorded. In accordance with the invention, the recording medium comprises a substrate, with an effective amount of a light-absorbing coating overlaying the substrate, such coating including an explosive material, wherein as the medium is moved with respect to the intensity-modulated write beam, the coating is selectively heated by the beam to induce spaced explosions therein, whereby corresponding irregularities, representative of the data signal, are formed in the outer surface of the coating. These irregularities can be in the form of either pits or upraised bumps, and, additionally, when the irregularities are in the form of pits, they can extend either completely through the coating, or alternatively, only to a prescribed depth therein.

More particularly, recording media in accordance with the present invention are adapted for use either as master recording discs from which disc replicas can be produced, or as direct-read-after-write recording discs. In either case, the recording apparatus with which it is used operates to focus onto the disc, as the disc is rotated at a prescribed angular velocity, both the intensity-modulated write beam of light and a substantially constant-intensity read beam of light. The read beam is reflected by the disc in accordance with the pattern of surface irregularities that is recorded by the write beam.

The special light-absorbing coating overlaying the substrate can advantageously include an explosive material such as nitrocellulose, trinitroaniline, or trinitrotoluene, all of which will automatically chemically react to produce non-condensible gases when selectively heated to a prescribed auto-ignition temperature by the focused write beam. The amount of energy from the intensity-modulated beam that is absorbed by the coating can be controlled such that the selected portions of the coating on which the beam impinges are either partially or completely exploded. Partial explosions result in the formation of upraised bumps in the outer surface of the coating, whereas complete explosions result in the formation of pits. For explosive materials that are colorless, it is necessary to add to the material a suitable dye that is absorptive of the write beam and that is color-stable and will remain in solution with the explosive material.

When the recording medium of the present invention is used as a master recording disc, the substrate is preferably a thick glass disc having a highly polished upper surface, and the surface irregularities formed in the special coating preferably have a depth of at least about 1,000 Å. The resultant master disc contains a succession of pits or bumps, representative of the data signal, that are narrower than even the $1/e^2$ diameter of the focused write beam, whereby an improved recording density can be achieved.

In accordance with one aspect of the invention, the coating is deposited on the glass substrate by initially admixing the explosive material and the selected dye, if required, with a suitable solvent. The resultant liquid solution is then poured on the upper surface of the substrate and the coated substrate is spun at a prescribed angular velocity until the liquid coating has achieved a substantially uniform thickness over the entire surface. Continued spinning at a prescribed angular velocity evaporates the solvent, leaving the special coating at a prescribed thickness. The coating thickness can be controlled by varying the viscosity of the solution and the angular velocity at which the disc is spun.

In accordance with another aspect of the present invention, a thin, metallic layer is interposed between the glass substrate and the special coating. This strengthens the bonding of the coating and, additionally, because the metallic layer is highly reflective, it facilitates a reading of the recorded data signal by the read beam of light, which trails the write beam.

The recorded master disc is suitably coated with a metallic coating that is, in turn, removed from the disc to produce a stamper for use in a molding apparatus to produce the disc replicas. The coating process preferably includes an initial step of vacuum depositing by thermal evaporation a relatively thin metallic layer, followed by a step of electroplating a relatively thick metallic layer. Because the information-bearing surface irregularities are substantially free of any residue material and of any rough or grainy edges, replica discs can be produced without significant risk of incurring damage from the stamper, and the data signal can be recovered from the replica discs with an improved signal-to-noise ratio.

When a recording medium in accordance with the present invention is used in a direct-read-after-write recording apparatus, the substrate is ordinarily a thin, disc-shaped plastic disc having a planar upper surface on which the special coating is deposited. This coating can be deposited in the same manner as described above.

For discs having a single recording surface, a disc-shaped plastic protective layer is ordinarily positioned in spaced relationship above the coating, with an annular cavity formed therebetween. The intensity-modulated write beam of light can be directed at the coating either from above, through the protective layer, or from below, through the substrate. For discs having two recording surfaces, two separate plastic substrates, with the special coatings deposited thereon, are positioned in spaced, confronting relationship. In this embodiment, the data signal is recorded by directing the intensity-modulated write beam at the selected special coating through the underlying substrate.

For embodiments of the recording medium in which the surface irregularities are in the form of upraised bumps, the light-absorbing coating can include an explosive layer that includes the explosive material and a thin, metallic layer overlaying the outer surface of the explosive layer. Each upraised bump produced in the explosive layer functions to form a corresponding bump in the overlaying metallic layer. This overlaying metallic layer enhances the reflectivity of the resultant disc, facilitating a reading of the data signal recorded therein. In this embodiment, the intensity-modulated beam of light can be directed at the medium from either above the thin metallic layer, or beneath the substrate, the coating being heated primarily by a thermionic and photoelectric emission of electrons from the metallic layer.

Other aspects and advantages of the present invention will become apparent from the following description of the preferred embodiments, taken in conjunction with the accompanying drawings, which disclose, by way of example, the principles of the invention.

BRIEF DESCRIPTION OF THE DRAWINGS

FIG. 1 is a simplified block diagram of apparatus for recording a data signal on a record disc, and for recovering the signal therefrom to verify that it was properly recorded;

FIG. 2 is an enlarged plan view of a portion of the record disc depicted in FIG. 1, showing the arrangement of pits or bumps representative of the recorded data signal;

FIG. 3 is a cross-sectional view (not to scale) of a prior art photoresist recording medium, after development, FIG. 4 is a cross-sectional view (not to scale) of a master recording disc of the present invention, showing an information-bearing pit formed in a special explosive coating;

FIG. 5 is a cross-sectional view (not to scale) of an alternative master recording disc of the present invention, showing an information-bearing bump formed in the special explosive coating;

FIG. 6 is a cross-sectional view (not to scale) of a direct-read-after-write recording disc having two recording surfaces, with information-bearing bumps formed in both surfaces; and FIG. 7 is a cross-sectional view (not to scale) of a direct-read-after-write recording disc having a single recording surface, with information-bearing bumps being shown therein.

DESCRIPTION OF THE PREFERRED EMBODIMENTS

Referring now to the drawings, and particularly to FIG. 1, there is shown a master disc recording apparatus for recording a data signal, such as a frequency-modulated video signal or digital signal, on a rotatable master recording disc 11. Such a master disc can be used to produce a stamper for use in a molding apparatus (not shown) for producing disc replicas. The recording apparatus operates to direct a write beam of light 13 onto the disc, as the disc is rotated at a prescribed angular velocity, the beam being modulated in intensity according to a data signal to be recorded. This forms a succession of microscopic information-bearing pits 15 or bumps 17 (FIG. 2), arranged in a plurality of substantially circular recording tracks 19 in a spiral or concentric circle pattern on the disc.

The recording apparatus further operates to focus onto the disc a read beam of light 21 having a constant intensity, substantially less than the peak intensity of the write beam 13, to scan the successive pits 15 or bumps 17 immediately after they are formed by the write beam. This permits a continuous control of both the power level and focus of the write beam, so that the signal can be recorded properly over the entire disc.

FIG. 3 is a simplified cross-sectional view (not to scale) of a recording disc that has been widely used in the past as a master disc. The disc includes a glass substrate 23 having a polished upper surface 25, and having a coating 27 of photoresist material deposited thereon. The disc is utilized in a master disc recording apparatus (not shown) wherein an intensity-modulated write beam of light is focused onto the photoresist coating as the disc is rotated in a prescribed fashion, to illuminate a succession of spaced, microscopic regions on the coating. The photoresist coating is then suitably developed, to remove all of the material in the spaced, illuminated regions, yielding a master disc having a succession of spaced pits 29, indicative of the data signal. The size of each pit in the photoresist coating cannot generally be made smaller than the $1/e^2$ diameter of the diffraction-limited spot formed by the focused write beam.

The developed master disc of FIG. 3 is then suitably coated with a metallic layer (not shown) that conforms to the pattern of spaced pits 29, and this metallic layer is then removed from the underlying disc to provide a stamper for use in a replica disc molding apparatus. It will be observed in FIG. 3 that the pits 29 formed in the photoresist coating 27 are characterized by sharply-defined sidewalls 31 that are ragged and grainy in structure. This roughened structure, which is duplicated in the resultant stamper, can result in damage to the disc replicas during the molding procedure.

FIG. 4 is a simplified cross-sectional view of one master recording disc 11 that can be used with the recording apparatus of FIG. 1. The disc includes a glass substrate 33 having a highly polished, planar surface 35 on its upper side, with a thin layer 37 of metallic material deposited thereon. Additionally, a special light-absorbing coating 39 is deposited on the metallic layer. The write beam of light 13 is transmitted through a medium of air adjacent the disc and focused to a diffraction-limited spot 41 on the outer surface of the special coating.

In accordance with the invention, the special coating 39 includes an explosive material and is highly absorptive of the intensity-modulated write beam of light 13, whereby as the disc 11 is rotated with respect to the beam, the coating is selectively heated by the beam to induce spaced explosions therein, forming corresponding irregularities, in the form of microscopic pits 15, representative of the data signal. The spaced pits are substantially free of any residue material and are free of sharp corners and roughened sidewalls, whereby the risk of damage to the disc replicas that are eventually produced is reduced, and whereby the signal-to-noise ratio of the data signals recovered from such disc replicas is improved. Additionally, the cross-sectional size of the pits can be made small relative to the diffraction-limited spot of the focused write beam, thereby further increasing the signal-to-noise ratio of the data signals that can be recovered from the disc replicas.

The metallic layer 37 is interposed between the substrate 33 and the information-bearing explosive coating 39 for two major purposes, one to improve the bonding of the coating material, and the other to provide increased reflectivity of the read beam of light 21, which scans the disc immediately after formation of the pits 15. Although the preferred metal for the layer 37 is titanium, there are other suitable metals, such as chromium and aluminum. In the preferred embodiment, titanium is vacuum deposited by thermal evaporation onto the upper surface 35 of the glass substrate 33, to a thickness of less than about 200 Å.

The explosive material included in the special light-absorbing coating 39 is a substance that will explode or undergo a rapid chemical reaction to produce gases whenever heated to its auto-ignition temperature. The coating preferably has a relatively low thermal conductivity, so that only the portions of the coating on which the intensity-modulated write beam 13 actually impinges are heated to the critical temperature. Moreover, it is important that the gaseous products of the rapid chemical reaction not condense back onto the coating or onto portions of the recording apparatus after they have cooled. Suitable explosive materials are nitrocellulose, trinitroaniline, and trinitrotolene.

In the preferred embodiment of the master disc recording apparatus (FIG. 1), the write beam 13 is produced by a conventional argon ion laser, which produces a beam having components at approximately 457, 488, and 514 nanometers. Accordingly, to be heated by the intensity-modulated write beam, the coating 39 must be absorptive of these wavelengths. Neither nitrocellulose nor trinitrotoluene is inherently highly absorptive of these wavelengths, so whenever these explosive materials are utilized, the coating further includes a suitable orange or red colored dye that is highly absorptive of the wavelengths. The dye must be color-stable and must be readily soluble with the explosive material used. The preferred dye is sold by American Color & Chemical Co. under the trademark AMPLAS ORANGE CR, but other suitable dyes include another dye sold by American Color & Chemical Co., this one under the mark ANAPLAST-SCARLET MM, and also 1-phenyl-azo-2-napthol and azobenzene-4-azo-2-napthol, sold by DuPont under the marks OIL ORANGE and OIL RED, respectively.

The special explosive coating 39 is deposited on the upper surface of the metallic layer 37 using a special process in which the explosive material and the dye, if required, are initially admixed with a suitable solvent. In the preferred process, ten parts (by weight) of nitrocellulose, three parts of AMPLAS ORANGE CR dye, and about 300-400 parts of the solvent cellosolve acetate, are combined to yield a solution having a viscosity of about 3-5 centipoise. Other suitable solvents for the explosive material and dye mixture include butyl acetate and amyl acetate.

The liquid solution is then poured on the upper surface of the metallic layer 37, and the coated substrate 33 and integral metallic layer are then spun at an angular velocity of about 1000 rpm until the solution has achieved a uniform thickness over the entire surface. Continued spinning at about 1000 rpm for about 20-30 seconds evaporates the cellosolve acetate completely, leaving the special coating 39 in the form of a solid solution bonded to the upper surface of the metallic layer.

The thickness of the coating 39 can be controlled by varying the viscosity of the solution and/or the spin speed. A final thickness of about 1300-1400 Å is preferred, because the pits 15 that are thereafter formed in the coating will have a corresponding depth, thereby enhancing the readability of replicas of this master disc. More specifically, when such replica discs are formed of poly methyl methacrylate, 1300-1400 Å corresponds to approximately one quarter wavelength of a read beam produced by a conventional helium neon laser, i.e. 6328 Å, in a disc playback apparatus (not shown).

It has been found that for a coating 39 having this prescribed thickness and having the prescribed relative proportions of nitrocellulose and the specified dye, microscopic pits having a width of about 0.3 microns are formed by a write beam 13 that is focused to a $1/e^2$ diameter of about 0.5 microns and that has a total power of about 20 milliwatts. It is believed that since the write beam impinges on a selected location on the disc 11 for a time period of less that about 100 nanoseconds, and since the coating 39 has a relatively low thermal conductivity, the spaced explosions are confined to the portions of the coating that are actually illuminated by the beam. It will be appreciated that for coatings that are proportionately more (or less) absorptive of the write beam, the intensity of the beam must be correspondingly lower (or higher) to achieve the same results.

After the pattern of microscopic pits 15, representative of the data signal, has been formed in the master disc 11, a metallic overlayer (not shown) is suitably deposited onto the recorded coating 39. The metallic overlayer is then removed from the underlying disc to produce a stamper, which, in turn, is used in a molding apparatus to produce replicas of the master disc. One suitable such molding apparatus is described in a commonly assigned and copending application for U.S. patent, Ser. No. 031,205, filed in the name of John R. Holmes and entitled "Molded Apparatus for Producing Centrally Apertured Record Discs".

One suitable technique for depositing the metallic overlayer includes an initial step of vacuum depositing by thermal evaporation a 100 Å layer of titanium directly onto the upper surface of the information-bearing coating 39, followed immediately by similarly vacuum depositing a 500 Å layer of nickel onto the titanium layer, followed by electro-plating a 15 mil layer of nickel onto the vacuum-deposited nickel layer. The resultant composite metallic layer can be peeled away from the underlying master disc 11 to become a suitable stamper. The recorded data signal is carried on the underside of the stamper, in the form of bumps, which correspond to the pits 15 of the master disc, and which will likewise are free of sharp corners and grainy sidewalls and are only approximately 0.3 microns in width.

FIG. 5 is a simplified cross-sectional view of an alternative master disc 11' in accordance with the present invention. The disc is identical in structure to the disc 11 of FIG. 4, except that it is adapted to absorb less energy from the intensity-modulated write beam of light 13. For a coating 39' having the same composition as that specified for the coating of FIG. 4, the intensity-modulated write beam 13 need have a power level of only about one milliwatt. As a result, there is sufficient energy to induce only incomplete explosions in the spaced areas on the coating that are illuminated by the scanning write beam, whereby an upraised bump 17 is formed at each such area. It is believed that each upraised bump results from a trapping of gases produced in the rapid chemical reaction that occurs in the coating when heated by the write beam. Metallic stampers can be formed from this master disc in similar fashion to the aforedescribed technique for producing stampers from the master disc of FIG. 4.

In another embodiment of a master disc in accordance with the present invention (not shown in the drawings), the special explosive coating is overlayed by a thin, metallic coating, having a thickness of about 100-200 Å, before the disc is scanned by the intensity-modulated write beam 13. Like the embodiment of FIG. 5, only partial explosions are induced in the explosive coating, producing upraised bumps therein and corresponding upraised bumps in the overlaying metallic coating. In this embodiment, the write beam preferably has a power level of about 2 milliwatts and is focused onto the overlaying metallic layer from above the disc, in which case the spaced, partial explosions in the underlying coating are induced by both thermionic and photoelectric emission of electrons from the metallic layer into the coating. Since the explosive coating is not being energized by absorption of the write beam, but rather by thermionic or photoelectric emission of electrons from the metallic layer, the explosive coating need not include a dye. Alternatively, the write beam can be focused onto the coating from below, through the substrate.

In yet another embodiment of a master recording disc in accordance with the present invention (not shown in the drawings), the explosive coating is substantially thicker than those shown in the embodiments shown in FIGS. 4 and 5, preferably having a thickness greater than about one micron, and the surface irregularities are in the form of pits that extend only partially into the top surface of the coating. The intensity-modulated write beam 13 is focused onto the top surface of the coating from above the disc. Because the depth of focus of the beam is limited to about 0.2 microns, however, the focused beam begins to diverge a short distance beneath the surface. As a result, the intensity of the beam is sufficiently high to heat the explosive material to its auto-ignition temperature only within about 0.4–0.6 microns of the upper surface.

With reference again to FIG. 1, the master disc recording apparatus for recording the data signal on the disc 11 will now be described in greater detail. The write beam of light 13 is produced by a write laser 42, such as an argon ion laser, and this constant-intensity beam is transmitted to an intensity modulator 43, which modulates the intensity of the beam in accordance with the data signal supplied over line 45 from a data sybsystem (not shown). The modulator can comprise either a pockels cell or an acoustic modulator. The intensity of the modulated beam is alternately greater than and less than a threshold at which the explosive material in the special coating 39 will reach its auto-ignition temperature, so a corresponding pattern of pits 15 or bumps 17 is formed in the disc.

The intensity-modulated write beam 13 is transmitted from the modulator 43 through a first beam splitter 47 to a mirror 49, where it is reflected and transmitted to an objective lens 51, which focuses it to the diffraction-limited spot 41 on the disc 11. The disc is rotated at a prescribed angular velocity by a spindle motor 53, and the mirror and the objective lens are mounted on a carriage (not shown) that is movable radially relative to the disc, so that the data signal can be recorded successively in the plurality of substantially circular recording tracks 19 (FIG. 2).

The read beam of light 21, which is utilized in reading the data signal immediately after it has been recorded on the disc, is produced by a read laser 55. The beam has a constant intensity, substantially less than that of the write beam 13. The read laser can advantageously comprise a helium neon laser, which produces a beam having a wavelength of approximately 6328 Å.

The read beam 21 is initially directed through a second beam splitter 57 to the first beam splitter 47, where it is reflected and combined with the write beam 13. Thereafter, it follows essentially the same path as the write beam until it is focused to a diffraction-limited spot 59 on the disc 11. The two beams are aligned such that their respective points of impingement 41 and 59 on the disc are approximately 5 microns apart, with the disc positioned such that the spots are in a common radius, and with the disc rotating such that the write beam scans a given point on that radius immediately prior to the read beam.

The read beam of light 21 has a constant intensity that is insufficient to heat the explosive coating to its auto-ignition temperature, so it does not produce any irregularities in the outer surface of the coating 39. Thus, in the master disc of FIG. 4, when the read beam impinges on portions of the disc 11 not occupied by a pit, it is transmitted through the coating and reflected by the underlying metallic layer 37 back to the objective lens 51. When it is focused on a pit 15, on the other hand, it is reflected by the metallic layer 37, but due to the small size of the pits relative to the wavelength of the read beam, it is diffracted or scattered by the pit and only a small proportion of it is collected by the objective lens. This is especially the case when a lens with a relatively low numerical aperture is utilized. Thus, the reflected beam collected by the objective lens is modulated in intensity by the recorded pattern of pits.

In similar fashion, when used with the master disc 11' of FIG. 5, the read beam of light 21 is reflected back to the objective lens 51 whenever it impinges on a portion of the explosive coating 39' not occupied by an upraised bump 17, but is scattered by diffraction whenever it impinges on such a bump. Thus, the reflected beam collected by the objective lens is similarly modulated in intensity by the recorded pattern of bumps.

The reflected read beam 21 collected by the objective lens 51 is transmitted from the lens via the mirror 49 to the first beam splitter 47, where it is reflected and transmitted to the second beam splitter 57. From there, the reflected beam is transmitted to a photodetector 61, which demodulates the beam and produces a corresponding read-after-write electrical signal. This signal is supplied over line 63 to appropriate circuitry (not shown) for continuously controlling both the power level and the focus of the write beam, whereby the data signal can be properly recorded over the entire surface of the disc 11.

In addition to use as a master recording disc, discs in accordance with the present invention can also be adapted for use as direct-read-after-write (i.e., "DRAW") recording discs, which are single recordings that are not used for purposes of replication. Such DRAW discs can be utilized with a recording apparatus having the same elements as that depicted in FIG. 1. The primary distinctions of such DRAW discs are that the explosive coating is located on an interior, protected surface of the disc, and that the substrate is thinner and formed of a material that is more resilient and less susceptible to damage, such as poly methyl methacrylate. As is the case with the aforementioned master recording discs, the information-bearing surface irregularities can be in the form of either pits or bumps.

FIG. 7 depicts one embodiment of such a DRAW disc, having only one information-bearing surface therein. The disc includes a plastic substrate 65 formed of a plastic material such as poly methyl methacrylate, with a special light-absorbing coating that includes an explosive layer 67 and an overlaying thin metallic layer 69, deposited on the substrate. Additionally, a disc-shaped plastic protective layer 71 is spaced approximately 0.020 inches above the metallic layer, to form a closed annular cavity 73 that protects the metallic layer from dust and abrasion.

The explosive layer 67 is preferably deposited on the plastic substrate 65 using the same process as used for the aforementioned master discs, but it preferably has a thickness of about 10,000 Å, so that any effects the solvent might have on the underlying plastic substrate will not affect the upper portion of the coating, where information-bearing bumps 75 are to be formed. The metallic layer 69 is preferably deposited on the explosive layer 67 using a thermal evaporation process.

The information-bearing bumps 75 are recorded in the disc by focusing onto the metallic layer 69 the intensity-modulated write beam of light 13, thereby producing spaced, partial explosions in the underlying portions of the explosive layer 67 and causing a pattern of upraised bumps to be formed in the upper portion of the explosive layer and in the overlaying metallic layer. The write beam can impinge on the metallic layer through the underlying substrate 65 or from above, through the spaced protective layer 71. Since the explosive layer is energized not by absorption of the write beam, but rather by thermionic or photoelectric emission of electrons from the metallic layer, it is not necessary for the coating to include a dye.

The read beam of light 21, which trails the write beam 13 by a prescribed amount, is reflected by the metallic layer 69 in accordance with the pattern of bumps 17 formed therein. When the beam impinges on a flat portion of the layer, it is reflected back toward the objective lens 51 and the reflected beam has a maximum intensity. When the beam impinges on a bump, on the other hand, it is diffracted and only a relatively small proportion of it is collected by the lens, so the reflected beam has a minimum intensity.

FIG. 6 depicts an alternative embodiment of a DRAW disc in accordance with the present invention, wherein the disc includes two information-bearing surfaces. The disc includes two plastic substrates 77a and 77b, with a special light-absorbing coating deposited on each substrate. The special coatings include a special explosive layer 79a or 79b and an overlaying metallic layer 81a or 81b. The substrates must be transparent to the intensity-modulated write beam 13 so that the beam can be transmitted therethrough to the corresponding overlaying coating. As was the case with the embodiment of FIG. 7, the explosive layer need not include a dye.

From the foregoing description, it should be apparent that the present invention provides an improved information recording medium for use in both master recording apparatus and direct-read-after-write recording apparatus, wherein the medium includes a special coating in which very small surface irregularities in the form of optically readable bumps or pits can be formed. The special coating includes an explosive material and the surface bumps or pits can be formed therein without the formation of any substantial residue material or any rough edges that could adversely affect the ultimate formation of replica discs. As a result, data signals can be recorded in the medium with a very high signal-to-noise ratio.

Although the invention has been described in detail with reference to its presently preferred embodiments, it will be understood by one of ordinary skill in the art that various modifications can be made, without departing from the spirit and scope of the invention. Accordingly, it is not intended that the invention be limited, except as by the appended claims.

I claim:

1. A method of producing a metallic stamper for use in forming recording disc replicas, said method comprising the steps of:

depositing a light-absorbing coating on a smooth, planar surface of a substrate, to form a recording disc, the light-absorbing coating including an explosive material and having a uniform thickness of less than about 6000 Å;

rotating the recording disc in a prescribed fashion relative to a beam of light that is modulated in intensity in accordance with a data signal to be recorded in the light-absorbing coating, said coating being selectively heated by the beam to induce spaced explosions, therein, to form corresponding irregularities in the outer surface of the coating, said irregularities having sizes substantially smaller than five microns and being formed without the need for a separate step of chemically developing the coating;

depositing an outer layer of metallic material on the recording disc, after the surface irregularities have been formed in the light-absorbing coating; and removing the outer metallic layer from the underlaying recording disc, to produce the metallic stamper.

2. A method as defined in claim 1, wherein:
   said substrate includes a glass material;
   said method further includes an initial step of vacuum depositing on the smooth, planar surface of the substrate an inner layer of metallic material; and
   said light-absorbing coating is deposited on the outer surface of the inner metallic layer.

3. A method as defined in claim 2, wherein:
   said inner metallic layer is formed of titanium; and
   said outer metallic layer includes
   a first layer formed of titanium, and
   a second layer, overlaying said first layer, formed of nickel.

4. A method as defined in claim 1, wherein said step of depositing the outer metallic layer includes:
   an initial step of vacuum depositing by thermal evaporation a first metallic layer; and
   a final step of electro-plating a second metallic layer onto the first metallic layer.

5. A method as defined in claim 4, wherein:
   the first metallic layer includes a bottom layer formed of titanium and a top layer formed of nickel; and
   the second metallic layer is formed of nickel.

6. A method as defined in claim 1, wherein said step of depositing the light-absorbing coating includes the steps of:
   depositing onto the substrate a liquid solution that includes the explosive material and a solvent;
   spinning the substrate at a first prescribed angular velocity until the liquid solution has achieved a substantially uniform thickness over the entire planar surface of the substrate; and
   spinning the substrate at a second prescribed angular velocity until the solvent in the liquid solution is substantially completely evaporated, leaving the light-absorbing coating deposited on the planar surface of the substrate.

7. A method as defined in claim 6, wherein:
   the solvent includes cellosolve acetate;
   the liquid solution has an initial viscosity of about 3–5 centipoise; and
   said first and second prescribed angular velocities are about 1000 rpm.

8. A method as defined in claim 1, wherein the light-absorbing coating deposited in the first step of depositing has a thickness of at least about 1000 Å.

9. A method as defined in claim 1, wherein the light-absorbing coating deposited in the first step of depositing has a thickness of about 1300 to 1400 Å.

10. A method as defined in claim 1, wherein the surface irregularities are pits having widths of about 0.3 microns.

* * * * *